United States Patent Office 3,363,186
Patented Jan. 9, 1968

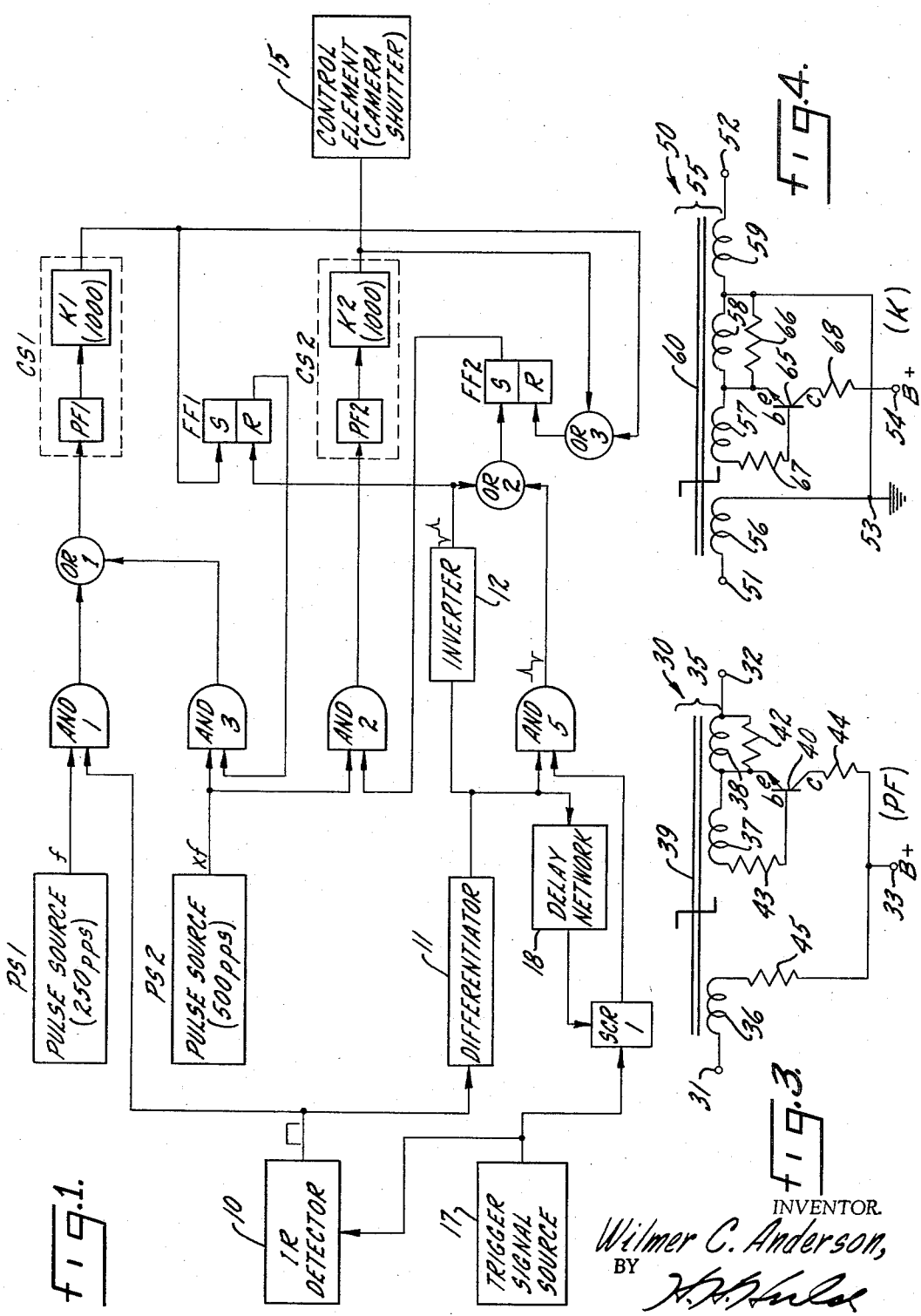

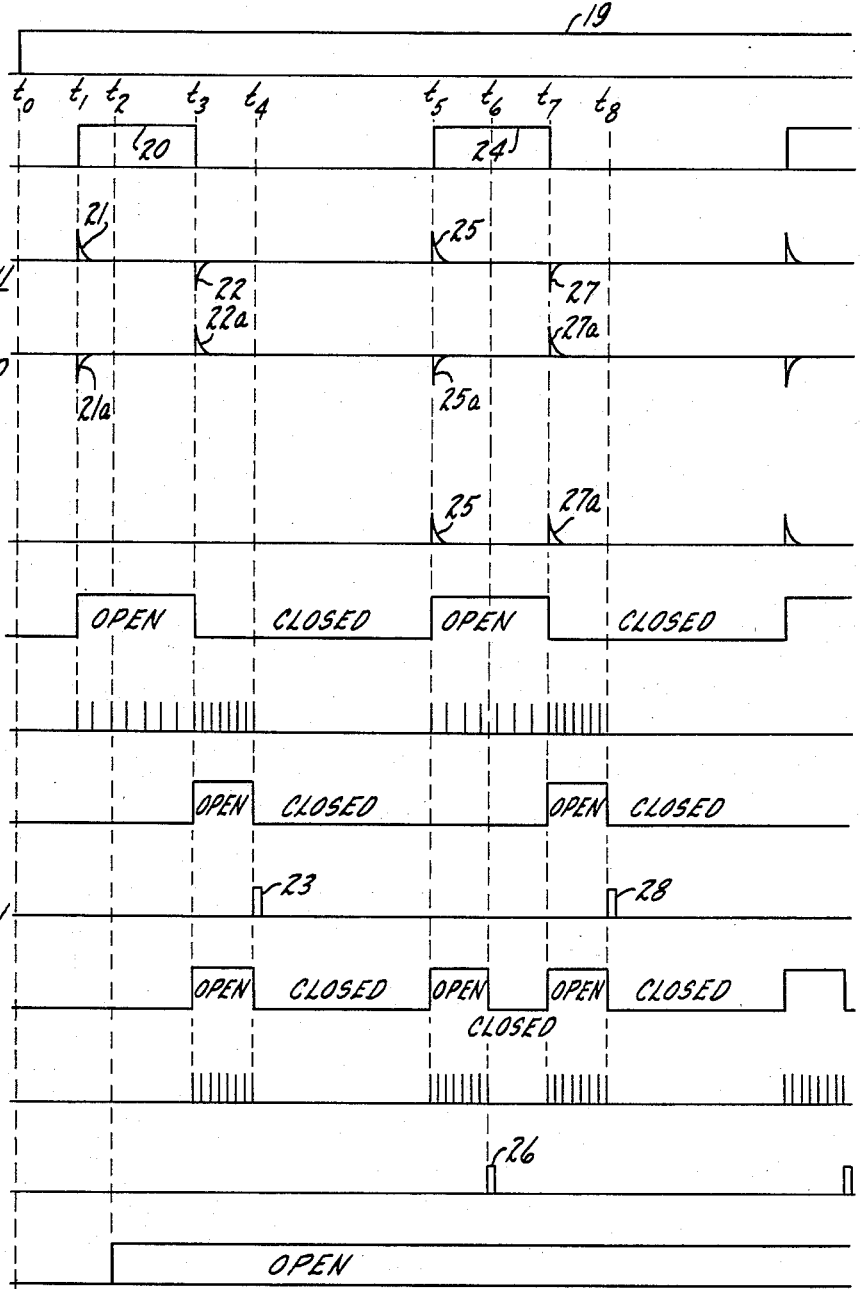

3,363,186
TIME INTERVAL SPLITTING DEVICE FOR PRODUCING CONTROL SIGNALS AT PRESELECTED RELATIVE POSITIONS DURING CYCLICAL CONTROL TIME INTERVALS
Wilmer C. Anderson, Greenwich, Conn., assignor to General Time Corporation, New York, N.Y., a corporation of Delaware
Filed Jan. 27, 1964, Ser. No. 340,402
7 Claims. (Cl. 328—73)

ABSTRACT OF THE DISCLOSURE

A time interval splitting device for producing an output signal at a precise relative position during prescribed control time intervals in cyclical control applications. The output signals are produced at the desired precise relative position even though the length of the time intervals may vary slowly from cycle to cycle over an extended period of time. The time interval splitting device includes two counter storage units with means for storing a count in the first counter storage unit representative of the length of the time interval, means for storing a count in the second counter storage unit equal to the additional count required to fill the first counter storage unit, and means for filling the second counter storage unit at the beginning of each time interval whereby the second counter storage unit is filled prior to the storage of the count in the first counter storage unit so that a final control pulse is produced at a precise relative time during each succeeding time interval.

---

The present invention relates to a time interval splitting device and more specifically to a device for controlling a desired operation at a preselected relative position during succeeding control time intervals.

In many cyclical control applications, a prescribed operation is initiated at a precise relative position during control time intervals of the succeeding cycles even though the length of the time intervals may vary slowly over an extended period of time. For example, in many machine tool applications, such as lathe applications, it is often desirable to initiate a prescribed operation at a precise angular position during each revolution of the work even though the peripheral length or diameter thereof is slowly changing. Additionally, in Strobe picture taking applications, it is often desirable for "firing" to take place at a specific angle in each revolution or cycle regardless of the speed of operation. Likewise, in satellite picture taking applications wherein the camera is in rotational movement, it is desirable for a picture of the earth to be taken at a precise time during the sweep of the camera between the opposite earth horizons.

A primary object of the present invention is to provide a new an improved time interval splitting device. Accordingly an object is to provide such a device wherein a prescribed operation is initiated at a precise relative time during succeeding control time intervals. A related object is to provide such a device which is capable of accurate controlling operation even though the length of the time intervals may vary slowly over an extended period of time.

Another object of the present invention is to provide a new and improved time interval splitting device which functions as an angle splitting device. More specifically, an object is to provide such a device for controlling a prescribed operation at a precise angle during succeeding, preselected angular sweeps. A related object is to provide such a device for controlling a prescribed operation at a precise angle during each revolution of associated equipment regardless of gradual changes in the rotational speed thereof and regardless of gradual changes in the peripheral length or diameter thereof.

A more specific object of the present invention is to provide a new and improved time interval splitting or angle splitting device utilizing only solid state elements and having no moving parts. Another more specific object is to provide such a device wherein magnetic counters are employed.

A general object of the present invention is to provide a solid state time interval splitting or angle splitting device which is ideally suited for use in remote equipment wherein a high degree of reliability and resolution is required. Another general object of the present invention is to provide such a device which is capable of miniaturization and thus is adaptable for use in applications wherein space is at a premium. Still another general object of the present invention is to provide a time interval splitting or angle splitting device adaptable for use in conjunction with industrial applications as well as space probe, missile and satellite applications.

Other objects and advantages of the inventon will become apparent upon reading the attached detailed description and upon reference to the drawings, in which:

FIGURE 1 is a block diagram of a time interval splitting or angle splitting device constructed in accordance with the present invention;

FIG. 2 is a pulse diagram depicting the operation of the device shown in FIG. 1;

FIG. 3 is a schematic diagram of a magnetic pulse former which may be utilized in the device shown in FIG. 1; and FIG. 4 is a schematic diagram of a magnetic counter which may be utilized in the device shown in FIG. 1.

While the invention has been described in connection with a certain preferred embodiment, it is to be understood that the invention is not to be limited to the disclosed embodiments but, on the contrary, the invention is intended to cover the various modifications and equivalent arrangements included within the spirit and scope of the appended claims. For the purpose of this description, the invention will be disclosed in connection with a time interval splitting device that functions as an angle splitting device for controlling a prescribed operation at a precise angle during each revolution of associated equipment. More specifically, the invention will be described in connection with controlling the "triggering" of a camera shutter at a precise angle during succeeding revolutions of a satellite or the like which houses the camera so that pictures are taken at a precise time or angle during succeeding sweeps between the earth's horizons. However, it is to be understood that the invention is intended to cover time intervals splitting or angle splitting devices capable of controlling any desired operation.

In accordance with the present invention, means including a counter storage unit have been provided for causing the storage unit to be filled to produce a final control pulse at a precise relative time during succeeding control time intervals. More specifically, such means have been provided for detecting the beginning and the end of succeeding control time intervals and for causing a final control pulse to be produced at a desired relative position therebetween.

Referring to FIG. 1, a time interval splitting or angle splitting device has been shown for producing a desired output control pulse which triggers a control element 15, such as a camera shutter, at a precise angle during a selected angular sweep of succeeding revolutions of a satellite or the like (not shown). In satellite picture taking of the earth, a camera is to be operated at a precise angular position during each sweep of the camera between the opposite earth horizons. Consequently, means must be provided for detecting when the camera is aligned with the earth horizon at the beginning of the sweep and when the camera is aligned with the earth horizon at the end of the sweep. In the exemplary arrangement, an infrared detector 10 has been provided for this purpose, the detector being associated with the camera (not shown) and producing a positive control pulse during the desired control interval in which the camera is being swept across the earth between the opposite horizons thereof. It will be readily appreciated that, in other control applications, various types of different detectors may be untilized for detecting the beginning and the end of succeeding control time intervals.

For the purpose of storing a count representative of the time interval of the control pulse produced by the detector 10, i.e., the time interval during which the detector 10 in the exemplary arrangement is sweeping across the earth between the opposite horizons thereof, a counter storage unit CS1 has been provided. As may be seen, the storage unit CS1 includes a pulse former PF1 and a counter K1. Input pulses are applied to the storage unit CS1 from a pulse source PS1 at a frequency of $f$ through an AND gate AND 1 and an OR gate OR 1 when the gate AND 1 is open. The output of the detector 10 is connected to one of the inputs of the gate AND 1 so that the gate AND 1 is open and pulses from the source PS1 are transmitted to the storage unit CS1 during the time period when the desired control pulse is being produced by the detector. Upon receipt of a preselected number of pulses, the counter K1 is filled to produce an output pulse and is reset to an initial condition. In order to allow for the most accurate operation of the counter K1, the pulse former PF1 has been interposed between the pulse source PS1 and the counter K1, the pulse former producing an output pulse having a desired constant volt-second content in response to the application of each input pulse thereto.

A second counter storage unit CS2 has been provided for the purpose of storing a count therein equal to the maximum count ($T_{max}$) attainable in the storage unit CS1 less the count ($T_x$) attained therein during a revolution of the satellite which is representative of the detector control pulse time interval. Additionally, as will become apparent, the storage unit CS2 is provided for the purpose of producing a final control pulse at a precise time during the time interval of each control pulse produced by the detector 10, the final control pulse initiating the operation of the control element 15. As may be seen, the storage unit CS2 also includes a pulse formed PF2 and a counter K2 which correspond to the respective pulse former PF1 and counter K1 in storage unit CS1, it being assumed that counters K1 and K2 have the same counting capacity. Input pulses are applied to the storage unit CS2 from a pulse source PS2 through an AND gate AND 2 at a frequency of $xf$ when the gate AND 2 is open, the $x$ representing a desired number greater than one so that pulses are produced by source PS2 at a greater frequency than produced by source PS1. Likewise, pulses are applied to the storage unit CS1 from the pulse source PS2 at a frequency of $xf$ through an AND gate AND 3 and the gate OR 1 when the gate AND 3 is open. Accordingly, when the gates AND 2 and AND 3 are open, pulses are applied to the storage units CS1 and CS2 at a higher frequency rate than pulses are applied to the storage unit CS1 when the gate AND 1 is open. If, subsequent to the storage of a count in the storage unit CS1 representative of the detector control pulse time interval, pulses are simultaneously applied to the storage units CS1 and CS2 by the pulse source PS2 until the storage unit CS1 is filled, it will be apparent that the count stored in the storage unit CS2 will be equal to the maximum count ($T_{max}$) of the storage unit CS1 less the detector control pulse time interval representing count ($T_x$) previously stored therein, i.e., the count in the storage unit CS2 will equal $$T_{max} - T_x$$

For the purpose of controlling the operation of the gates AND 2 and AND 3, a pair of flip-flops FF1 and FF2 have been provided. The flip-flops have been symbolically illustrated and a brief description of the operations thereof may be helpful in understanding the present invention. Each flip-flop has two sections, one being designated S and the other being designated R. Inputs are connected to the left-hand sides of the S and R sections of the flip-flops, whereas an output is connected to the right-hand side of the R section of the flip-flop FF1 and an output is connected to the right-hand side of the S section of the flip-flop FF2. When a positive input pulse or signal is applied to the S input of a flip-flop, the flip-flop is switched from the reset condition to the set condition, provided it was previously in the reset condition, and a desired output signal is provided at the S output. Conversely, when a positive input pulse or signal is applied to the R input, the flip-flop is switched from the set condition to the reset condition, provided it was previously in the set condition, and a desired output signal is provided at the R output.

The R output of the flip-flop FF1 is connected to an input of the gate AND 3 so that, when the flip-flop FF1 is in the reset condition, the gate AND 3 is open and pulses from the source PS2 are transmitted therethrough to the storage unit CS1. Likewise, the S output of the flip-flop FF2 is connected to an input of the gate AND 2 so that, when the flip-flop FF2 is in the set condition, the gate AND 2 is open and pulses from the source PS2 are transmitted therethrough to the storage unit CS2. It will be apparent that some means must be provided for driving the flip-flop FF1 to the reset condition and the flip-flop FF2 to the set condition subsequent to the production of the control pulse by the detector 10 so that pulses from the source PS2 are transmitted to the storage units CS1 and CS2 whereby a count equal to $T_{max} - T_x$ is stored in the storage unit CS2.

For this latter purpose, a differentiator 11 is provided for responding to the control pulse produced by the detector 10 to produce a positive spike-like pulse at the beginning of the detector control pulse and to produce a negative spike-like pulse at the end of the detector control pulse. The output of the differentiator is connected through an inverter 12 to the R input of the flip-flop FF1 and through the inverter 12 and an OR gate OR 2 to the S input of the flip-flop FF2. The inverter 12 inverts the pulses produced by the differentiator 11 so that a negative spike-like pulse is provided at the beginning of each detector control pulse and a positvie spike-like pulse is provided at the end of each detector control pulse. Since the flip-flops FF1 and FF2 are responsive only to positive input pulses, flip-flop FF1 is reset and flip-flop FF2 is set at the end of each detector control pulse, i.e., at the end of each detected control time interval. Accordingly, the gates AND 3 and AND 2 are respectively opened and pulses from the source PS2 are transmitted to the storage units CS1 and CS2 subsequent to the storage of a count $T_x$ representative of the detector control pulse time interval in the storage unit CS1. Subsequently, the storage unit CS1 will be filled to produce an output pulse when a count equal to $T_{max} - T_x$ has been stored in storage unit CS2. As may be seen, the output of the storage unit CS1 is connected to the S input of the flip-flop FF1 and is also connected through an OR gate OR 3 to the R input of the flip-flop FF2. It follows that, when the storage unit CS1 is filled to produce an outut pulse, the flip-flop FF1 is driven to the set condition and the flip-flop FF2 is driven to the reset condition whereby the gates AND 3 and AND 2 are respectively closed so that the further transmission of pulses therethrough to the storage units CS1 and CS2 is prohibited. Thus, subsequent to the production of each control pulse by the detector 10, a count is stored in the storage unit CS2 which is equal to the maximum count attainable in the storage unit CS1 less the time interval representing the count stored therein during the detector output pulse time interval, i.e., which is equal to $T_{max}-T_x$.

As previously mentioned hereinabove, the storage unit CS2 is also provided for the purpose of producing a final control pulse at a precise relative time during the time interval of each control pulse produced by the detector 10, i.e., at a precise time during each control time interval. The final control pulse is in turn transmitted to the control element 15 which controls the desired operation, the triggering of a camera shutter in the instant case, so that a picture of the earth is taken at a precise time during each sweep across the earth between the opposite horizons thereof.

For the purpose of causing pulses to be transmitted to the storage unit CS2 so that the counter K2 is filled at the precise time to produce the final control pulse, the output of the differentiator 11 is connected to the S input of the flip-flop FF2 through the gate OR 2. Accordingly, the flip-flop FF2 is driven to the set condition in response to the positive spike-like pulse produced by the differentiator at the beginning of each detector control pulse time interval and the gate AND 2 is opened so that pulses from the source PS2 are transmitted to the storage unit CS2. It follows that while pulses are being transmitted to the storage unit CS1 from the pulse source PS1 in response to the production of a detector control pulse, pulses are simultaneously being transmitted to the storage unit CS2 from the pulse source PS2. Since the total count obtainable in counters K1 and K2 is the same ($T_{max}$) and since the count previously stored in the storage unit CS2 is equal to the maximum count of the storage unit CS1 less the count attained therein during the next preceding detector control pulse time interval ($T_{max}-T_x$), it will be apparent that the additional count required to fill the storage unit CS2 is equal to the count attained in the storage unit CS1 during the next preceding detector output pulse, i.e., is equal to $T_x$. Assuming that the time interval for the next succeeding detector control pulse remains substantially constant, the count to be attained in the storage unit CS1 is also equal to $T_x$. However, since pulses are applied to the storage unit CS2 by pulse source PS2 at a greater rate than pulses are applied to the storage unit CS1 by the pulse source PS1, the counter K2 is filled to produce the final control pulse before the count $T_x$ is attained in the counter K1. Thus, the final control pulse is produced by the counter K2 of the storage unit CS2 at a precise time during the time interval of the detector control pulse. As will become apparent, the precise relative time at which the final control pulse is produced is determined by the relative frequencies of the outputs of the pulse sources PS1 and PS2. Assuming that the time interval of each subsequent detector control pulse remains substantially constant, the final control pulses subsequently produced will be produced at a precise relative time during the succeeding time intervals.

As may be seen, the final control pulse is also applied to the R input of the flip-flop FF2 so that the flip-flop is reset and the gate AND 2 is closed whereby the further transmission of pulses from the source PS2 to the storage unit CS2 is prohibited.

For the purpose of initiating the operation of the time interval splitting or angle splitting device shown in FIG. 1, a trigger signal source 17 has been provided for applying a triggering signal to the detector 10. Thus, at any preselected time the device may be rendered operative. Once the trigger signal is applied to the detector, the detector is rendered operative to subsequently produce the desired time interval representing control pulses. In view of the foregoing, it will be apparent that the flip-flop FF2 will be set and the gate AND 2 will be opened in response to the positive pulse produced by the differentiator 11 at the beginning of the first detector control pulse so that pulses are transmitted from the source PS2 to the counter CS2. However, prior to the production of the first control pulse by the detector, no count equal to $T_{max}-T_x$ will have been attained in the storage unit CS2. Accordingly, if pulses are permitted to be transmitted from the source PS2 to the counter storage unit CS2 during the time interval of the first detector control pulse, an erroneous final control pulse will be produced by the storage unit CS2, i.e., the final control pulse will not be produced at the precise relative time.

In order to prevent the production of such an erroneous final control pulse, means have been provided for preventing the transmission of the positive pulse produced by the differentiator 11 to the flip-flop FF2 at the beginning of the first detector control pulse. For this purpose, an AND gate AND 5 has been interposed between the output of the differentiator 11 and the S input of the flip-flop FF2. The operation of the gate AND 5 is in turn controlled by a silicon-controlled rectifier SCR1. As may be seen, the output of the trigger signal source 17 is applied to the input of SCR1 so that when SCR1 is rendered conductive, the trigger signal is transmitted therethrough to an input of the gate AND 5 causing the gate to be opened. SCR1 is triggered to conduction by the first positive-going spike-like output pulse of the differentiator 11 which is transmitted thereto through a delay network 18. The delay network 18 is provided for the purpose of delaying the triggering of SCR1 to conduction until the first positive spike-like pulse of the differentiator 11 has terminated. Thus, subsequent to the production of the first positive spike-like pulse by the differentiator 11 corresponding to the beginning of the first control pulse produced by the detector 10, the gate AND 5 is maintained open as long as the trigger signal is provided by the trigger signal source 17 so that subsequent positive pulses produced by the differentiator 11 are transmitted to the flip-flop FF2.

In order to provide a better understanding of the operation of the time interval splitting or angle splitting device shown in FIG. 1, a pulse diagram of the operation thereof has been shown in FIG. 2. Referring thereto, let it be assumed that at time $t_0$ an output is provided by the trigger signal source 17 which renders the device operative. At time $t_1$, the detector 10 begins to provide a control pulse 20. In response to the beginning of the detector control pulse, a positive spike-like pulse 21 is produced by the differentiator 11, whereas a negative spike-like pulse 21a is provided by the inverter 12. Additionally, in response to the beginning of the detector control pulse 20, the gate AND 1 is opened so that pulses are applied to the storage unit CS1 from the pulse source PS1. At time $t_2$, the gate AND 5 is opened in response to the pulse 21 from the differentiator 11. Subsequently, at time $t_3$, the detector control pulse 20 ends causing a negative spike-like pulse 22 to be produced by the differentiator 11, whereas a positive spike-like pulse 22a is provided by the inverter 12. Further, at this time, the gate AND 1 is closed and a count of $T_x$ will have been stored in the storage unit CS1 representative of the time interval of the detector control pulse 20.

The positive spike-like pulse 22a produced by the inverter 12 at time $t_3$ is applied to the R input terminal of the flip-flop FF1 causing the flip-flop to be reset so that the gate AND 3 is opened and pulses are transmitted from the source PS2 to the storage unit CS1. Likewise, the pulse 22a is applied to the S input of the flip-flop FF2 causing it to be set so that the gate AND 2 is opened and pulses from the source PS2 are also transmitted to the storage unit CS2. At time $t_4$, the storage unit CS1 is filled and produces an output pulse which is transmitted to the S input of the flip-flop FF1 causing it to be set and is transmitted to the R input of the flip-flop FF2 causing it to be reset. In response to the flip-flop FF1 being set and the flip-flop FF2 being reset, the respective gates AND 3 and AND 2 are closed so that the further transmission of pulses from the source PS2 to the respective storage units CS1 and CS2 is prohibited. A count of $T_{max}-T_x$ will now have been stored in the storage unit CS2, whereas storage unit CS1 will have been reset to its initial or zero condition.

Thereafter, at time $t_5$, a second control pulse 24 is produced by the detector 10 causing a positive spike-like pulse 25 to be produced by the differentiator 11 and a negative spike-like pulse 25a to be provided by the inverter 12. The pulse 25 is transmitted through gates AND 5 and OR 2 to the S input of the flip-flop FF2 causing the flip-flop to be set. As a result, the gate AND 2 is opened so that pulses are transmitted to the storage unit CS2 from the source PS2. At the same time, the gate AND 1 is opened in response to the control pulse 24 from the detector 10 so that pulses are simultaneously transmitted to the storage unit CS1 from the source PS1. Due to the fact that pulses are applied to storage unit CS2 at a greater rate than pulses are applied to the storage unit CS1, the storage unit CS2 is filled, at time $t_6$, to produce a final control pulse 26 which is transmitted to the control element 15, the final control pulse 26 being produced at a precise, desired relative time during the production of the control pulse by the detector, i.e., at a precise relative time during the desired control time interval. The final control pulse 26 is also transmitted to the R input terminal of the flip-flop FF2 through the gate OR 3 causing the flip-flop to be reset so that the further transmission of pulses to the storage unit CS2 from the source PS2 is prohibited.

Subsequently, at time $t_7$, the pulse 24 from the detector 10 ends causing a negative spike-like pulse 27 to be produced by the differentiator 11, whereas a positive spike-like pulse 27a is produced by the inverter 12. The pulse 27a is simultaneously transmitted to the R input terminal of the flip-flop FF1 causing it to be reset and to the S input terminal of the flip-flop FF2 causing it to be set. In response thereto, the gates AND 3 and AND 2 are opened so that pulses from the source PS2 are respectively transmitted therethrough to the storage units CS1 and CS2. At time $t_8$, the storage unit CS1 is again filled to produce an output pulse which causes the gates AND 3 and AND 2 to be closed so that the further transmission of pulses to the storage units CS1 and CS2 from the source PS2 is prohibited. Subsequently, this cycle of operation will continue to occur in response to each control pulse produced by the detector 10 so that a final control pulse is produced by the storage unit CS2 at a precise relative time during each detector control pulse, i.e., during each control time interval.

In view of the foregoing, it is apparent that a count of $T_x$ is to be attained in the storage unit CS2 between times $t_5$ and $t_6$, whereas the same count is to be attained in the storage unit CS1 between times $t_5$ and $t_7$. For this purpose, pulses are supplied by the source PS2 at a frequency of $xf$, whereas pulses are supplied by the source PS1 at a frequency of $f$. Accordingly, the time interval between times $t_5$ and $t_6$ is equal to $1/x$ times the time interval between times $t_5$ and $t_7$ so that the final control pulse 26 is produced at a time during the detector control pulse 24 which may be determined by the equation $(1/x)(t_{24})$ wherein $t_{24}$ is the time interval of the pulse 24 and is thus the control time interval to be split. For example, if the output frequency of source PS2 is $2f$ or twice the output frequency of the source PS1, the final control pulse 26 will occur at $(1/2)(t_{24})$ or midway during the time interval of pulse 24, i.e., the control time interval will be split in half. Consequently, the time during the control time interval at which the final control pulse is produced is directly dependent upon the ratio of the output frequency of source PS1 to the output frequency of the source PS2.

In a typical satellite picture taking operation, the satellite will have a minimum spin rate of approximately 9 r.p.m. and the IR sensor or detector 10 will have a maximum detecting angle of approximately 136°, i.e., the angle between the opposite earth horizons is 136°. Conversely, the satellite will have a maximum spin rate of approximately 12 r.p.m. and the IR detector 10 will have a minimum detecting angle of approximately 116°. Assuming that the source PS1 has an output frequency of 250 pulses per second, a count ($T_x$) of approximately 630 will be stored in storage unit CS1 with a detecting angle of 136° and a satellite spin rate of 9 r.p.m. On the other hand, a count ($T_x$) of approximately 403 will be stored in storage unit CS1 with a detecting angle of 116° and a satellite spin rate of 12 r.p.m. Assuming further that the output frequency of the source PS2 is 500 pulses per second, it follows that the final control pulse and thus triggering of the camera shutter is to take place midway in the detecting angle, i.e., at 68° with maximum conditions and at 58° with minimum conditions. Under such operating conditions, the angle splitting or time interval splitting device will have a minimum resolution of 58°/403 pulses which is equal to 0.15° per pulse. For such operation, the counter storage units CS1 and CS2 would have a maximum count $T_{max}$ on the order of 1000, i.e., the counters K1 and K2 would be "1000" counters.

Referring to FIG. 3, a pulse former 30 is illustrated which may be utilized in the above-described time interval or angle splitting device. However, the invention is not intended to be limited to the use of such a pulse former, but rather is intended to cover the use of any desired pulse former. Reference may be made to the U.S. Patent No. 2,897,380, issued July 28, 1959, to C. Neitzert, for the details of construction and operation for the pulse former. Briefly stated, the pulse former has an input terminal 31 and an output terminal 32. Power is supplied to the pulse former through a terminal 33 from a power supply, designated as B+. The heart of the pulse former is a saturable reactor 35 having an input winding 36, a triggering winding 37, and an output-reset winding 38 all wound on a core 39 constructed of material having a substantially rectangular hysteresis loop. A transistor 40 has its input circuit connected across the triggering winding and has its output circuit connected in series with the output-reset winding.

In response to each input pulse, the saturation of the core is exceeded and, when the saturating input pulse is abruptly terminated, a voltage is induced in the triggering winding 37 due to the sudden collapse of excess flux which triggers the transistor 40 so that current flows through the output-reset winding 38. The resulting flow of current in the output-reset winding 38 not only drives the core 39 toward its opposite condition of saturation, but also induces a voltage in the triggering winding 37 which causes still further current to flow through the transistor output circuit to the point where a condition of negative saturation is achieved in the core of the reactor. This restores the pulse former to its initial state in readiness to receive a subsequent input pulse and induces an output pulse at the output terminal 32 having a predetermined constant volt-second content. A damping resistor 42 is connected in parallel with the output-reset winding 38, base current for the transistor 40 is limited by a series resistor 43, and current in the transistor output circuit is limited by a series resistor 44. Additionally, a resistor 45 is connected in series with the input winding 36 to limit the current flow therethrough.

Referring to FIG. 4, a counter 50 is illustrated which may be utilized in the above-described time interval or angle splitting device and which also is constructed in accordance with the teachings of the above-mentioned Neitzert patent. In like manner, the invention is not intended to be limited to the use of such a counter, but rather is intended to cover the use of any desired counter. Briefly stated, the counter has an input terminal 51, an output terminal 52, a ground terminal 53, and a terminal 54 through which power is supplied to the counter by a power supply, designated as B+. The heart of the counter is a saturable reactor 55 having an input winding 56, a triggering winding 57, a reset winding 58 and an output winding 59 wound on a core 60 constructed of material having a substantially rectangular hysteresis loop. A transistor 65 has its input circuit connected across the triggering winding and has its output circuit connected in series with the reset winding. The material of the core is so chosen and the counter is so constructed that, when an input pulse is applied to the input winding, the magnetization of the core is advanced one step from negative saturation toward the condition of positive saturation.

The number of pulses required for positive saturation to be attained depends upon the cumulative energy content of the input pulses. When a prescribed number of input pulses cause the saturation of the core to be exceeded and the saturating input pulse is abruptly terminated, a voltage is induced in the triggering winding 57 due to the sudden collapse of excess flux which triggers the transistor 65 so that current flows through the reset winding 58. The resulting flow of current in the reset winding not only drives the core toward the opposite condition of saturation, but also induces a voltage in the triggering winding 57 which causes still further current to flow through the transistor output circuit to the point where a condition of negative saturation is achieved in the core of the reactor. This restores the device to its initial state in readiness to receive a new series of input pulses and induces an output pulse in the output winding 59 which appears at the output terminal 52. To prevent operation of the transistor 65 in response to small changes in flux which occur during each step of advancement toward saturation, a damping resistor 66 is placed in parallel with the reset winding 58. Moreover, to limit the base current of the transistor in the face of a large voltage induced in the triggering winding, a series resistor 67 is used. Finally, there is provided in series with the collector of the transistor 65 a low value resistor 68 for the purpose of limiting the reset current which not only tends to protect the transistor, but which also limits the load which is placed upon the power supply B+.

In the illustrated embodiment, the counters K1 and K2 may include a plurality of counters, such as that illustrated in FIG. 4, which are cascaded or connected in tandem.

The details of the remaining circuit components illustrated in block form in FIG. 1 will not be set forth herein since such components are well known to those skilled in the art and do not, in and of themselves, constitute a part of the present invention.

In view of the foregoing, it will be apparent that a time interval splitting or angle splitting device has been provided for producing a final control pulse and thus for initiating a desired operation at a precise relative time during succeeding control time intervals.

I claim as my invention:

1. In a time interval splitting device, the combination which comprises, a first counter storage unit, means rendered operative during each prescribed time interval for storing a count in the first counter storage unit representative of the length of the time interval, a second counter storage unit which produces a final control pulse when filled, means rendered operative at the end of each time interval for storing a count in the second counter storage unit equal to the additional count required to fill the first counter storage unit, and means rendered operative at the beginning of each time interval for causing the second counter storage unit to be filled prior to the storage of the count in the first counter storage unit so that a final control pulse is produced at a precise, preselected, relative time during each succeeding time interval.

2. In a time interval splitting device, the combination which comprises, a first counter storage unit, means rendered operative during each prescribed time interval for storing a count in the first counter storage unit representative of the length of the time interval, a second counter storage unit for producing a final control pulse when filled, means rendered operative at the end of each time interval for storing a count in the second counter storage unit equal to the additional count required to fill the first counter storage unit, and means rendered operative at the beginning of each time interval except the first time interval for causing the second counter storage unit to be filled so that a final control pulse is produced thereby at a precise, preselected, relative time during each succeeding time interval.

3. In a time interval splitting device, the combination which comprises, a first counter storage unit including a magnetic counter, means rendered operative during each prescribed time interval for storing a count in the first counter storage unit representative of the length of the time interval, a second counter storage unit including a magnetic counter which produces a final control pulse when filled, means rendered operative at the end of each time interval for storing a count in the second counter storage unit equal to the additional count required to fill the first counter storage unit, and means rendered operative at the beginning of each time interval for causing the second counter storage unit to be filled prior to the storage of the count in the first counter storage unit so that a final control pulse is produced at a precise, preselected, relative time during each succeeding time interval.

4. In a time interval splitting device, the combination which comprises, a first counter storage unit for counting the number of pulses applied thereto and which is filled to produce an output pulse upon receipt of a prescribed number of pulses, means rendered operative during each time interval for applying pulses to the first counter storage unit at a first frequency rate, a second counter storage unit for counting the number of pulses applied thereto and which is filled to produce a final control pulse upon receipt of a prescribed number of pulses, means rendered operative at the end of each time interval for simultaneously applying pulses to the first and second counter storage units at a second frequency rate which is greater than the first frequency rate, means responsive to an output pulse produced by the first counter storage unit for rendering the second frequency rate pulse producing means inoperative, and means rendered operative at the beginning of each time interval for applying pulses to the second counter storage unit at the second frequency rate so that the second counter storage unit is filled to produce a final control pulse at a precise, preselected, relative time during each succeeding time interval.

5. In a time interval splitting device, the combination which comprises, means for cyclically producing a control pulse having a prescribed time interval, a first counter storage unit for counting the number of pulses applied thereto and which is filled to produce an output pulse upon receipt of a prescribed number of pulses, means responsive to each time interval control pulse for applying pulses to the first counter storage unit at a first frequency rate during the time period thereof, a second counter storage unit for counting the number of pulses applied thereto and which is filled to produce a final control pulse upon receipt of a prescribed number of pulses, means rendered operative at the end of each time interval control pulse for applying pulses to the first and second counter storage units at a second frequency rate which is greater than the first frequency rate, means responsive to an output pulse produced by the first counter storage unit for rendering the second frequency rate pulse producing means inoperative, and means operative at the beginning of each time interval control pulse and until the second counter storage unit is filled for applying pulses to the second counter storage unit at the second frequency rate so that a final control pulse is produced thereby at a precise, preselected, relative time during each time interval control pulse.

6. In a time interval splitting device, the combination which comprises, a first counter storage unit for counting the number of pulses applied thereto and which is filled to produce an output pulse upon receipt of a prescribed number of pulses, means rendered operative during each time interval for applying pulses to the first counter storage unit at a first frequency rate, a second counter storage unit for counting the number of pulses applied thereto and which is filled to produce a final control pulse upon receipt of a prescribed number of pulses, the prescribed number of pulses required to fill the first and second counter storage units being equal, means rendered operative at the end of each time interval for applying pulses to the first and second counter storage units at a second frequency rate which is greater than the first frequency rate, means responsive to an output pulse produced by the first counter storage unit for causing the second frequency rate pulse producing means to be rendered inoperative, means rendered operative at the beginning of each time interval for applying pulses to the second counter storage unit at the second frequency rate so that the second counter storage unit is filled to produce a final control pulse at a precise, preselected, relative time during each succeeding time interval, and means responsive to each final control pulse for rendering the second, second frequency rate pulse producing means inoperative.

7. In a time interval splitting device, the combination which comprises, a first counter storage unit including a magnetic pulse former and a magnetic counter for counting the number of pulses applied thereto, the counter of the first counter storage unit being filled to produce an output pulse upon receipt of a prescribed number of pulses, means rendered operative during each time interval for applying pulses to the first counter storage unit at a first frequency rate, a second counter storage unit including a magnetic pulse former and a magnetic counter for counting the number of pulses applied thereto, the counter of the second counter storage unit being filled to produce a final control pulse upon receipt of a prescribed number of pulses, the prescribed number of pulses required to fill the counters of the first and second counter storage units being equal, means rendered operative at the end of each time interval for applying pulses to the first and second counter storage units at a second frequency rate which is greater than the first frequency rate, means responsive to an output pulse produced by the counter of the first counter storage unit for causing the second frequency rate pulse producing means to be rendered inoperative, means rendered operative at the beginning of each time interval for applying pulses to the second counter storage unit at the second frequency rate so that the counter of the second counter storage unit is filled to produce a final control pulse at a precise, preselected, relative time during each succeeding time interval, and means responsive to the final control pulse for rendering the second, second frequency rate pulse producing means inoperative.

References Cited
UNITED STATES PATENTS

| | | | |
|---|---|---|---|
| 2,619,282 | 11/1952 | Manley | 328—48 |
| 2,988,275 | 6/1961 | Thomason | 328—48 X |
| 3,035,767 | 5/1962 | Orr | 328—48 X |
| 3,037,166 | 5/1962 | Alexander | 328—129 X |

ARTHUR GAUSS, *Primary Examiner.*

J. JORDAN, *Assistant Examiner.*